(12) United States Patent
Murata

(10) Patent No.: US 8,616,314 B2
(45) Date of Patent: Dec. 31, 2013

(54) WHEEL DRIVING APPARATUS

(75) Inventor: Satoshi Murata, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 261 days.

(21) Appl. No.: 13/139,885

(22) PCT Filed: Oct. 9, 2009

(86) PCT No.: PCT/JP2009/067962
§ 371 (c)(1),
(2), (4) Date: Jun. 15, 2011

(87) PCT Pub. No.: WO2010/073802
PCT Pub. Date: Jul. 1, 2010

(65) Prior Publication Data
US 2011/0247887 A1     Oct. 13, 2011

(30) Foreign Application Priority Data
Dec. 22, 2008   (JP) .................................. 2008-326245

(51) Int. Cl.
*B60K 1/00*     (2006.01)
(52) U.S. Cl.
USPC ...................................... 180/65.51; 301/6.91
(58) Field of Classification Search
USPC ............... 180/65.51, 65.6; 301/6.5–6.91, 6.1, 301/6.15
See application file for complete search history.

(56) References Cited

U.S. PATENT DOCUMENTS

| | | | |
|---|---|---|---|
| 5,156,579 A * | 10/1992 | Wakuta et al. ................ | 475/161 |
| 5,327,034 A | 7/1994 | Couture et al. | |
| 5,355,039 A | 10/1994 | Couture | |
| 5,901,801 A | 5/1999 | Toida et al. | |
| 6,176,352 B1 * | 1/2001 | Maron et al. .............. | 188/1.11 E |
| 7,306,065 B2 * | 12/2007 | Nagaya ....................... | 180/65.51 |
| 7,556,112 B2 * | 7/2009 | Suzuki et al. .............. | 180/65.51 |
| 7,624,830 B1 * | 12/2009 | Williams ....................... | 180/165 |
| 7,703,565 B2 * | 4/2010 | Ikenoya et al. ............ | 180/65.51 |
| 2007/0096586 A1 | 5/2007 | Cros et al. | |
| 2008/0169141 A1 | 7/2008 | Suzuki | |

FOREIGN PATENT DOCUMENTS

| | | |
|---|---|---|
| DE | 199 48 224 | 6/2001 |
| JP | 6 18760 | 3/1994 |
| JP | 7 31401 | 6/1995 |
| JP | 9-109695 | 4/1997 |

(Continued)

OTHER PUBLICATIONS

International Search Report Issued Jun. 18, 2010 in PCT/JP09/067962 filed Oct. 9, 2009.

(Continued)

*Primary Examiner* — John Walters
*Assistant Examiner* — James Triggs
(74) *Attorney, Agent, or Firm* — Oblon, Spivak, McClelland, Maier & Neustadt, L.L.P.

(57) ABSTRACT

A wheel driving apparatus is provided. The wheel driving apparatus includes a cylindrical inner housing supported by a vehicle body via a suspension, a wheel supported by the cylindrical inner housing so that the wheel is rotatable relative to the cylindrical inner housing, a motor having a stator attached to the cylindrical inner housing and a rotor attached to the wheel. The wheel includes a main body portion and an outside portion positioned on an outer side of the vehicle body, and the rotor is attached to the main body portion.

8 Claims, 11 Drawing Sheets

(56) References Cited

FOREIGN PATENT DOCUMENTS

| | | |
|---|---|---|
| JP | 2002 234304 | 8/2002 |
| JP | 2004 115014 | 4/2004 |
| JP | 2005 14729 | 1/2005 |
| JP | 2007-22386 | 2/2007 |

OTHER PUBLICATIONS

Japanese Office Action issued Aug. 7, 2012, in Japan Patent Application No. 2008-326245 (with English translation).

* cited by examiner

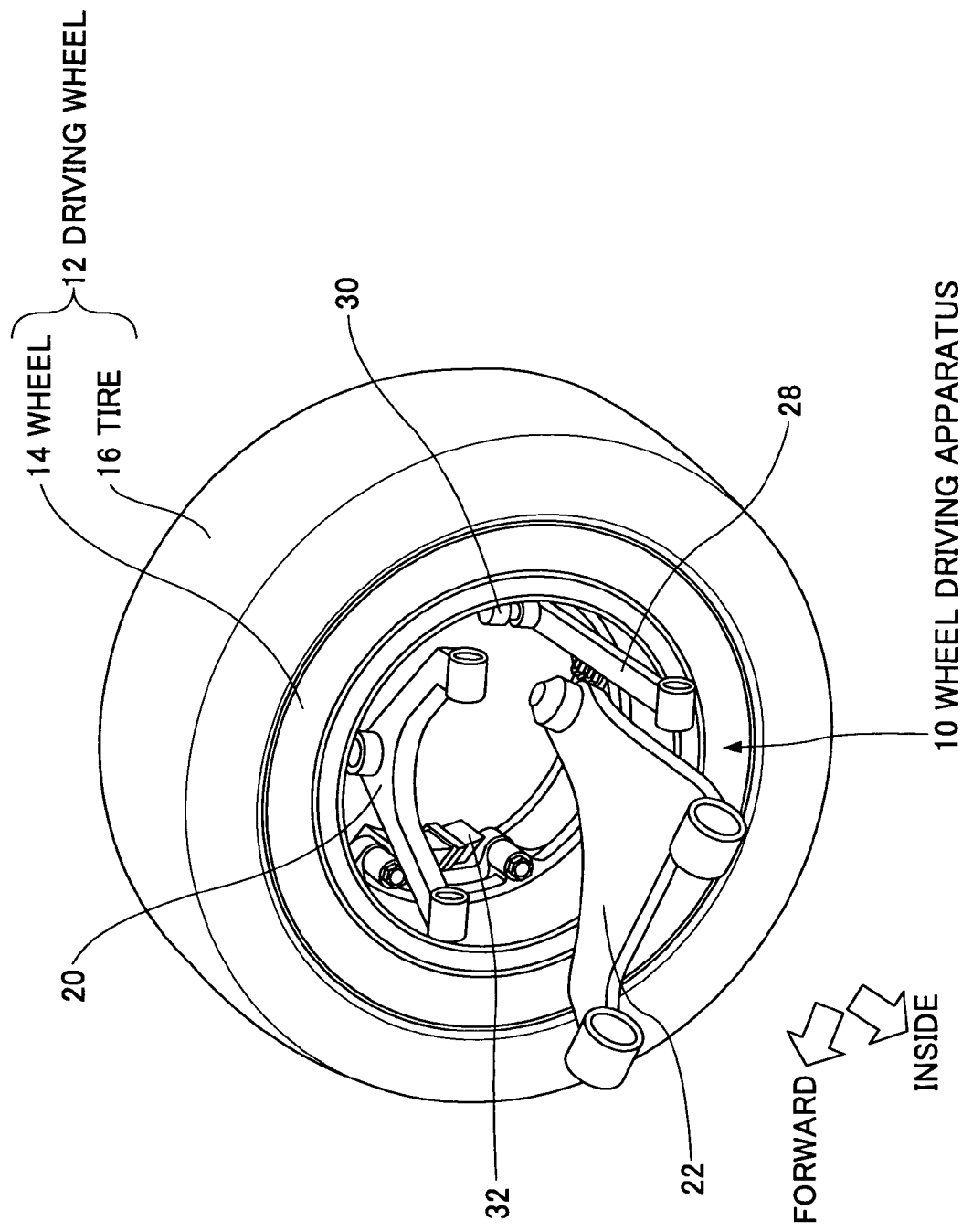

WHEEL DRIVING APPARATUS

TECHNICAL FIELD

The present invention generally relates to a wheel driving apparatus, and more particularly, to a wheel driving apparatus of a direct drive and outer rotor type which is configured by integrating a wheel and a motor.

BACKGROUND ART

Conventionally, a wheel is rotated to drive a vehicle using an in-wheel motor (vide, for example, Patent Document 1). This wheel driving apparatus employs a direct drive and outer rotor system. The in-wheel motor has a stator attached to a knuckle member serving as a housing on an inner peripheral side and a rotor attached to a wheel on an outer peripheral side, whereby the stator and the rotor are arranged opposite one another. In this wheel driving apparatus, the rotor is integrated with the wheel and rotation of the in-wheel motor is directly transmitted to the wheel.

Patent Document 1: Japanese Unexamined Patent Application Publication No. 2004-115014

In the wheel driving apparatus disclosed in Patent Document 1, the wheel, to which the rotor is attached, is configured to have a cylindrical shape and to have rims on both ends of the wheel along an axial direction, whereby the rims are integral with the wheel body and extending toward an outer side in a radial direction of the wheel. Further, the housing, to which the stator is attached, is shaped like a cylinder. The housing has on its inner peripheral side an attaching portion to which a suspension aim, a tie rod and so on are attached.

In such the structure of the wheel driving apparatus, because the rotor is integrated with the wheel, it is necessary to dismount an entire wheel along with an entire rotor when it becomes necessary to exchange the wheel because of damage on an outer side of a body of the wheel or the like. Further, suspension members are attached to the housing, to which the stator is attached. Therefore, before a tire is exchanged, it is necessary to disconnect the wheel from a suspension and remove the wheel including the motor and a tire in its entirety. According to the wheel driving apparatus disclosed in Patent Document 1, great care is required for a tire exchange and workability of the tire exchange is poor.

DISCLOSURE OF THE INVENTION

Accordingly, it is a general object of the present invention to provide a novel and useful wheel driving apparatus with an improved workability of exchanging wheels and tires The above object of the present invention is achieved by an aspect of a wheel driving apparatus including a cylindrical inner housing supported by a vehicle body via a suspension, a wheel supported by the cylindrical inner housing so that the wheel is rotatable relative to the cylindrical inner housing, a motor having a stator attached to the cylindrical inner housing and a rotor attached to the wheel, wherein the wheel includes a main body portion and an outside portion positioned on an outer side of the vehicle body, and the rotor is attached to the main body portion.

With the above aspect of the invention, the wheel is divided into at least two portions, i.e. the main body portion and the outside portion. Since the wheel can be divided, it is possible to detach only the outside portion of the wheel. It is also possible to attach the outside portion to the main body portion while keeping the rotor fixed to the main body portion of the wheel. According to the aspect of the present invention, it is possible to exchange the outside portion which is more vulnerable to damage than the main body portion of the wheel without removing the rotor from the main body portion of the wheel. Further, by detaching only the outside portion, it is possible to exchange a tire without removing a driving wheel from a vehicle body. According to the aspect of the present invention, a workability of exchanging the wheel driving apparatus can be improved.

According to another aspect of the present invention, there is provided the wheel driving apparatus according to the above aspect, wherein when a wheel attachment is attached to the main body portion, the wheel attachment does not prevent the outside portion from being attached to and detached from the main body portion.

With the above aspect of the invention, the outside portion can be attached to and detached from the main body portion while preventing the outside portion from being in contact with the wheel attachment attached to the main body portion.

According to another aspect of the present invention, there is provided the wheel driving apparatus according to the preceding aspects, further including: a brake caliper which is attached to the main body portion and includes brake pads; and a circular brake disc which has an outer diameter smaller than an inner periphery of the outside portion is attached to the main body portion and is configured to be clamped by the brake pads on an inner peripheral side of the circular brake disc, thereby stopping the circular brake disc from rotating.

With the above aspect of the invention, the outside portion can be detached while preventing the outside portion from being in contact with the circular brake disc attached to the main body portion.

According to another aspect of the present invention, there is provided the wheel driving apparatus according to the preceding aspects, wherein the main body portion includes: a center portion that has a side rib extending along an entire inner periphery of the center portion toward a rotational axis of the wheel; and an inside portion that has a side rib extending along an entire inner periphery of the inside portion toward the rotational axis of the wheel.

With the above aspect of the invention, components of the motor are accommodated inside a spacial region formed between the side rib of the center portion and the side rib of the inside portion. Further, the side ribs extend along the entire inner periphery of the main body portion toward the rotational axis of the wheel, and the motor is retained between these ribs. Therefore, an efficiency of assembling motor components and wheel components is improved, and an annular rigidity or circle hardness of the main body portion of the wheel can be improved.

According to another aspect of the present invention, there is provided the wheel driving apparatus according to the preceding aspect, wherein the center portion and the inside portion are connected to configure the main body portion at positions outside an outermost periphery of the rotor from the rotational axis of the wheel.

With the above aspect of the invention, the center portion and the inside portion are connected by, for example, bolts at a position outside an outer diameter of the rotor. Because it is unnecessary to form fastening holes on the wheel at a position adjacent to the rotor in a rotational axis direction, a width of the entire wheel in a side direction of the vehicle body can be shortened.

According to another aspect of the present invention, there is provided the wheel driving apparatus according to the preceding aspects, wherein the main body portion has a plurality of openings, which are made along a circular coil end of the stator and toward the circular coil end along the rotational axis and can accommodate a cooling fluid, and outermost diameters of the openings around the rotational axis are smaller than outermost diameter of the circular coil end of the stator around the rotational axis.

With the above aspect of the invention, the openings rotate when the wheel rotates and communicate with a cooling fluid chamber included in a spacial region. The cooling fluid enters the openings. The cooling fluid is carried upward by the openings along with rotation of the wheel, and concentrates on outer peripheral sides inside the openings around the rotational axis by a centrifugal force caused by the rotation. The outer peripheral sides inside the openings are positioned inside the outermost periphery of the circular coil end of the stator, the cooling fluid concentrated on the outer peripheral sides inside the openings moves toward the circular coil end of the stator. Thus, the cooling fluid tends to be discharged to an entire periphery of the circular coil end, thereby improving a cooling efficiency.

According to another aspect of the present invention, there is provided the wheel driving apparatus according to the preceding aspect, wherein a group of the plurality of openings are made in the side rib of the inside portion along the circular coil end of the stator, and another group of the plurality of openings are made in the side rib of the center portion along the circular coil end of the stator.

With the above aspect of the invention, the cooling fluid moves from the openings into the circular coil ends on inner and outer sides along the rotational axis. Thus the circular coil ends on the both sides of the stator can be easily cooled to improve a cooling efficiency.

According to another aspect of the present invention, there is provided the wheel driving apparatus according to the preceding aspect, further including: bearings which are arranged in the vicinity of respective innermost diameters of the side ribs and support the wheel so as to be rotatable relative to the inner housing; and seals which are arranged in the vicinity of the respective innermost diameters of the side ribs and seal gaps between the wheel and the inner housing.

With the above aspect of the invention, the bearings and the seals are arranged in the vicinity of the respective innermost diameters of the side ribs of the wheel. Therefore, it is possible to reduce relative circumferential speeds of the bearings and the seals, thereby extending mechanical lives of the bearings and the seals and improving reliabilities thereof.

According to another aspect of the present invention, there is provided the wheel driving apparatus according to the preceding aspects, wherein the inner housing further includes: an inner peripheral rib extending along an entire inner periphery of the inner housing toward a rotational axis of the wheel and integrating attaching portions for a suspension and for the brake caliper.

With the above aspect of the invention, although a large stress is applied to these attaching portions, it is possible to ensure an annular rigidity or circle hardness of the inner housing by the inner peripheral rib integrating the attaching portion for the suspension and for the brake caliper.

According to another aspect of the present invention, there is provided the wheel driving apparatus according to the preceding aspects, wherein the inner housing further includes: an outer peripheral rib extending along an entire outer periphery of the inner housing outward from the outer periphery.

With the above aspect of the invention, an annular rigidity or circle hardness of the inner housing is ensured by the outer peripheral rib included in the inner housing.

Other objects, features, and advantages of the present invention will become more apparent from the following detailed description when read in conjunction with the accompanying drawings.

BRIEF DESCRIPTION OF THE DRAWINGS

FIG. 1A is a perspective view showing a wheel equipped with a wheel drive apparatus of an embodiment of the present invention.

BEST MODE FOR CARRYING OUT THE INVENTION

A description will now be given, with reference to FIG. 1A through FIG. 8B, of embodiments of the present invention.

Figure 1B:
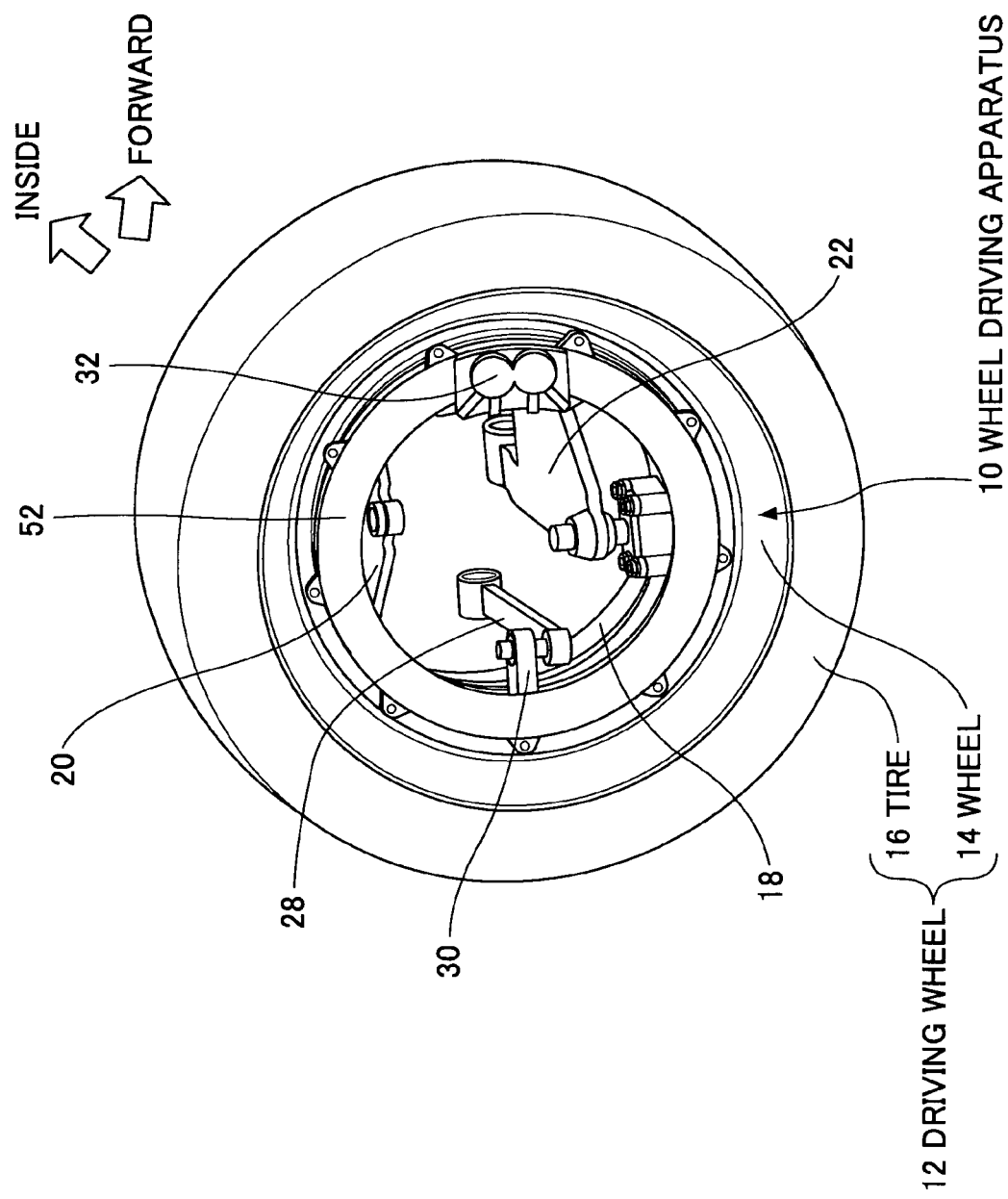
FIG. 1B is a perspective view showing a wheel equipped with a wheel drive apparatus of an embodiment of the present invention.
Figure 2:
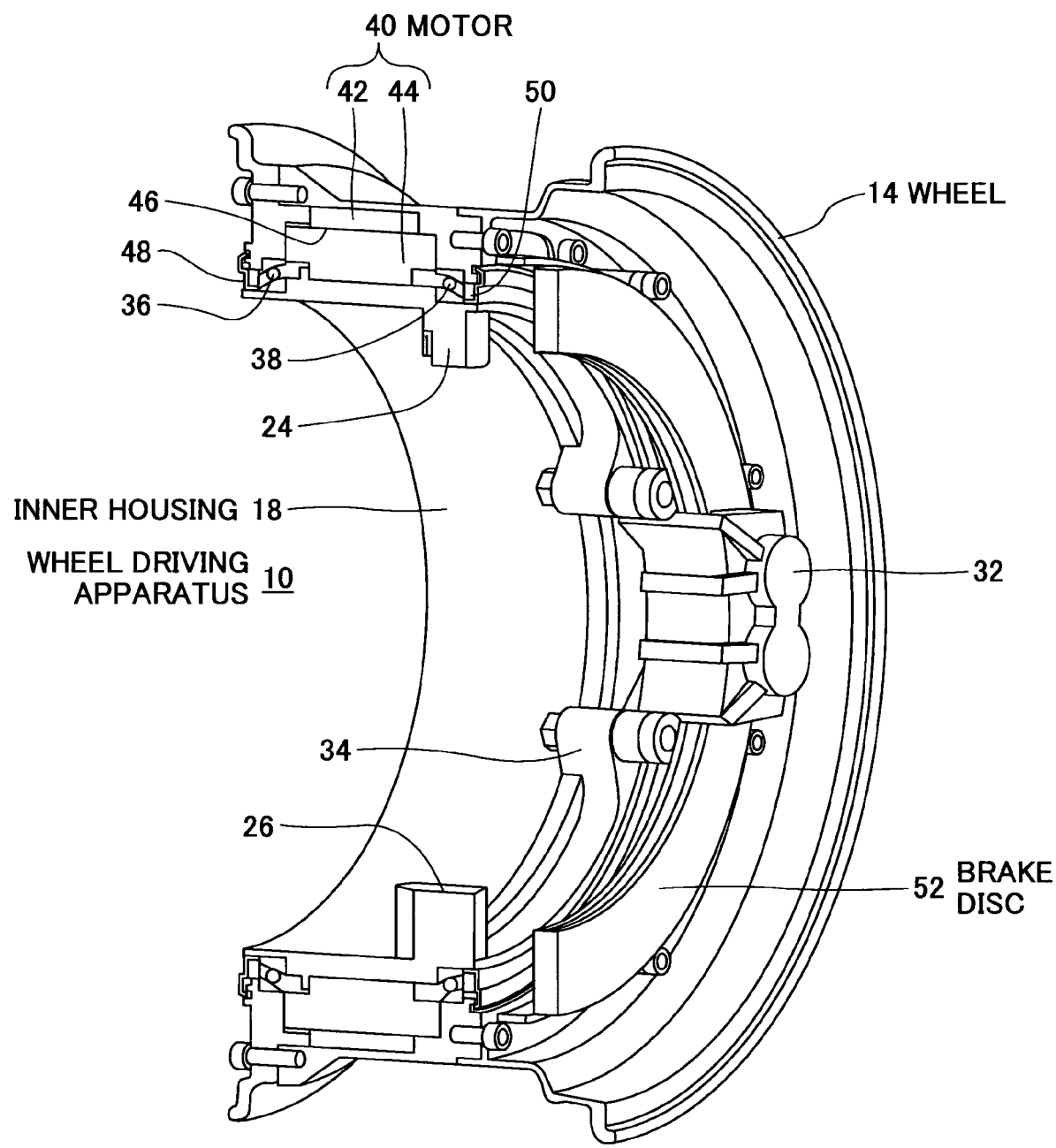
FIG. 2 is a cut-away perspective view showing a main section of a wheel driving apparatus of the embodiment by cutting away in a radial direction thereof.

FIGS. 1A and 1B are perspective views for showing a driving wheel 12 equipped with a wheel driving apparatus 10 according to an embodiment of the present invention. FIG. 1A is viewed from an inner side of a vehicle and FIG. 1B is viewed from an outer side of the vehicle. FIG. 2 is a perspective view showing a main section of a wheel driving apparatus 10 of the embodiment by partially cutting away in a radial direction thereof.

The wheel driving apparatus 10 of this embodiment is respectively equipped in driving wheels of a vehicle to drive the driving wheels. The wheel driving apparatus is applied to an electric vehicle which is equipped with a motor as a driving power source inside its wheel. Because the structure of the embodiment is the same among the driving wheels, the explanation will be given to only one of the driving wheels. The structure may be applied to only front wheels or only rear wheels.

The wheel driving apparatus 10 constitutes a driving wheel and includes a wheel 14 made from aluminum or iron and a tire 16 made from rubber. The wheel 14 and the tire 16 are respectively shaped like a cylinder and rotational member enabled to rotate relative to a body of a vehicle. An inner housing 18 is disposed inside the cylinder. The inner housing 18 is shaped like a cylinder and disabled to rotate relative to the vehicle body.

A suspension arm attaching portion 24 for attaching one end of an upper arm 20 that constitutes a suspension via a ball joint, a suspension arm attaching portion 26 for attaching one end of a lower aim 22 that constitutes a suspension through a ball joint, a tie rod attaching portion 30 for attaching a tie rod 28 through a ball joint, and a brake caliper attaching portion 34 for attaching a brake caliper 34 are formed on an inner peripheral surface of the inner housing 18. The other ends of the suspension arms 20 and 22 are connected to the vehicle body through a bushing or the like so that the suspension arms can vertically swing. The inner housing 18 is a knuckle member supported by the vehicle body through the suspension. The wheel 14 is supported by the inner housing 18 via radial bearings 36 and 38 so that the wheel is rotatable relative to the cylindrical inner housing. The radial bearings 36 and 38 function as so-called axle bearings.

The wheel driving apparatus 10 includes a motor 40 serving as a driving source provided in the respective driving wheels 12. The motor 40 is disposed on an inner peripheral side of the wheel 14 and includes a rotor 42 made of a permanent magnet in a ring like shape and a stator 44 produced by winding a coil around an iron core. The rotor 42 is attached along an inner periphery of the wheel 14. Further, the stator 44 is attached to an outer peripheral surface of the inner housing 18. A spacial region 46 is formed between the inner housing 18 and the wheel 14 and accommodates the rotor 42 and the stator 44. The rotor 42 and the stator 44 are arranged opposite one another while maintaining a small gap between the rotor 42 and the stator 44 along a radius direction inside the above-described spacial region 46. Here, the above radial bearings 36 and 38 further function as motor bearings.

The spacial region 46 between the inner housing 18 and the wheel 14 is hermetically sealed at end portions in a rotational axis direction by oil seals 48 and 50. A cooling and lubricating oil is hermetically enclosed inside the spacial region 46. The spacial region 46 is shaped like a ring.

Oil gathers in a lower portion of the spacial region 46. The oil inside the spacial region 46 is discharged to a circular coil end 44a of the stator 44 in order to cool the circular coil end 44a or is discharged to the radial bearings 36 and 38, thereby lubricating these.

The oil chamber is formed in a part or all of the spacial region 46 configured by a region occupied by a rotor 42; a region occupied by a stator 44; a region surrounded by a side rib 72, the rotor 42 and the stator 44; a region surrounded by the side rib 72, the rotor 42 and the stator 44; a region in the vicinity of a circular coil end 44a surrounded by an inner housing 18, a bearing 36 and the stator 44; a region in the vicinity of the circular coil end 44a surrounded by the inner housing 18, a bearing 38 and the stator 44; a region surrounded by the bearing 36 and an oil seal 48; a region surrounded by the bearing 38 and an oil seal 50; a region occupied by the bearing 36; a region occupied by the bearing 38; and various gaps among the above-mentioned components like a gap between the stator 44 and the side rib 72 and a gap between the stator and a center portion.

A coil of the stator 44 is connected to a battery equipped in the vehicle via a switching device. When the switching device is controlled to supply a power by a controller provided in the vehicle body, the power is supplied from the battery thereby energizing the coil. The rotor 42 is rotated by an electromagnetic force generated between the rotor 42 and the stator 44 when the coil is energized.

A brake disc 52 of a brake device is attached by bolts to the wheel 14. The brake disc 52 is shaped like an annular disk and clamped and released by brake pads assembled in a brake caliper 32, which is attached to the inner housing on an inner peripheral side of the brake disc 52. The brake disc 52 rotates along with the wheel 14 and stops rotating when clamped by the brake pads of the brake caliper 32.

When the stator 44 of the motor 40 is energized, the rotor 42 is rotated by an electromagnetic force generated between the stator 44 and the rotor 42 depending on an energized state. In this occasion, the wheel 14 and the tire 16 are integrally rotated along with the rotation of the rotor 42. One of the rotating directions of the motor 40 corresponds to a rotating direction for driving forward, and the other corresponds to a rotating direction for driving backward.

The wheel driving apparatus 10 can directly transmit the rotation of the motor 30 to the wheel 14. Thus, a drive train of the direct drive and outer rotor type for rotating the driving wheel 12 including the wheel 14, the tire 16 and the brake disc 52 is realized.

As described, the rotor 42 of the motor 30 is attached to the wheel 14 in the wheel driving apparatus 10 of the embodiment. Also as described, the stator 44 of the motor 30 is attached to the inner housing 18, and the suspension arms 20 and 22, the tie rod 28, and the brake caliper 32 are attached to the inner housing 18 through the attaching portions 24, 26, 30 and 34.

If a rotor 42 is integrated into a wheel 14 and the wheel 14 has one piece structure, it becomes necessary to remove not only the wheel but also the rotor 44 in case of repairing damage on an outer side surface of the wheel. Or, if it is structured to remove a wheel 14 along with a tire 16 from a vehicle body in exchanging the tire 16 by dismounting it from the wheel 14, it becomes necessary to remove the entire driving wheel 12 including the wheel 14 and a motor 40 by disconnecting the driving wheel 12 from the suspension.

In the cases where the wheel 14 is the one piece structure and the rotor 42 cannot be easily disassembled from the wheel or it is necessary to remove the entire driving wheel 12 from the vehicle body in order to exchange the tire, workability becomes poor by spending a long time and a large effort for exchanging the wheel 14 in addition to the tire 16.

Here, the wheel driving apparatus 10 of the embodiment has a structure of not causing such the disadvantage. Hereinafter, a feature of the embodiment will be described with reference to FIGS. 3 to 8.

Figure 3:
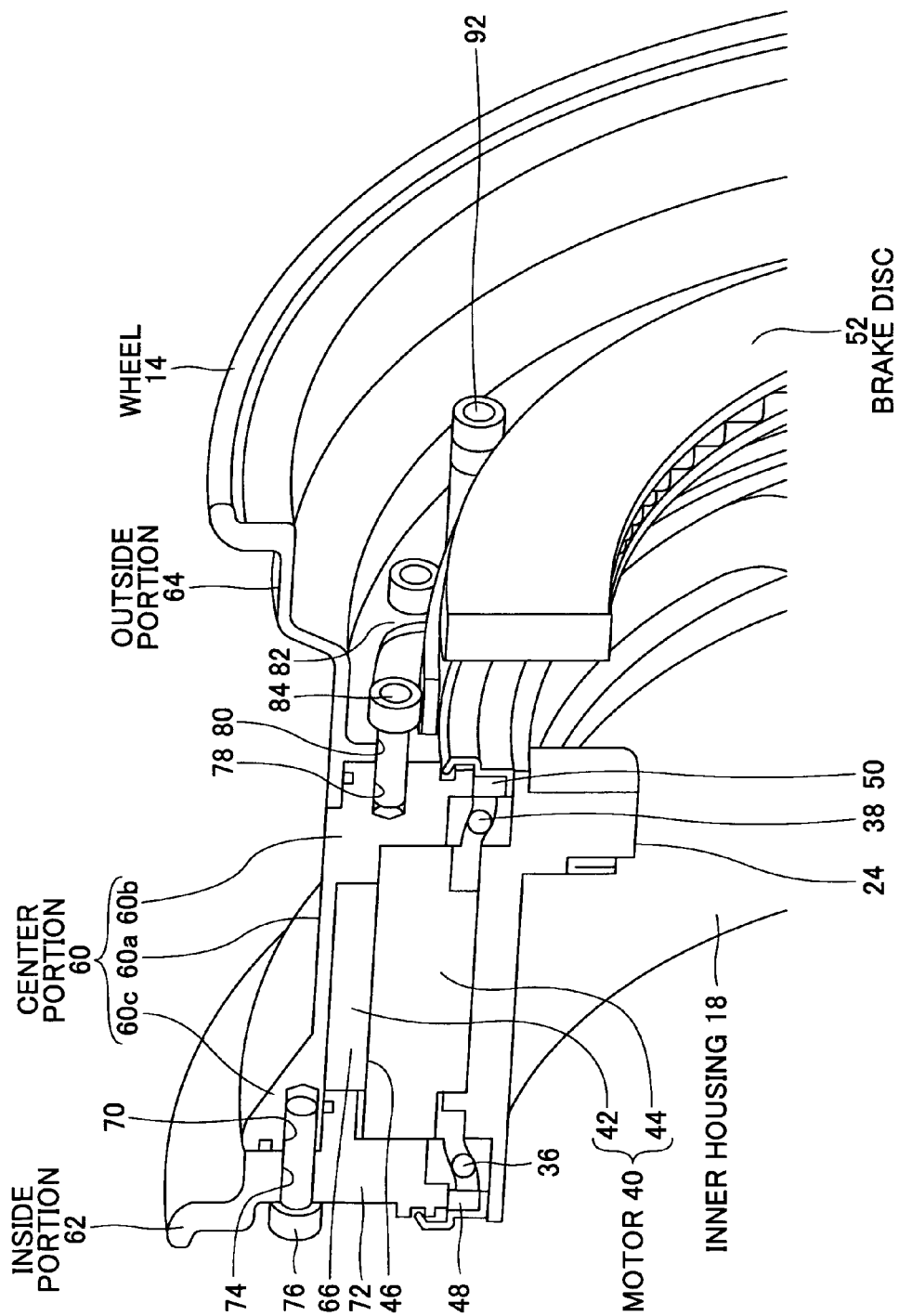
FIG. 3 is an enlarged cut-away perspective view showing a main section of a wheel driving apparatus of the embodiment in a radial direction thereof.
Figure 4:
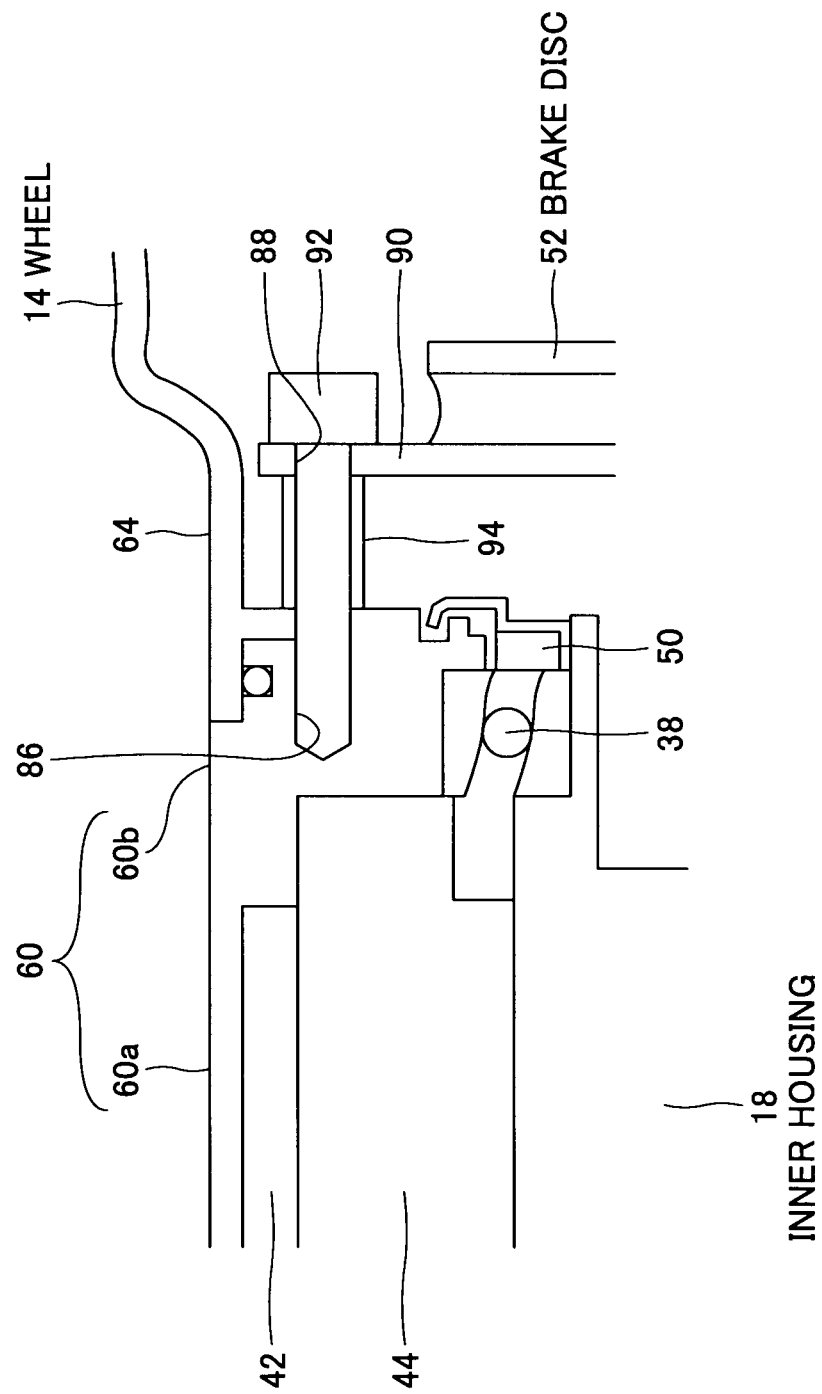
FIG. 4 is an enlarged cross-sectional view showing a main section of a wheel driving apparatus of the embodiment taken along a predetermined plane other than that in FIG. 3.
Figure 5:
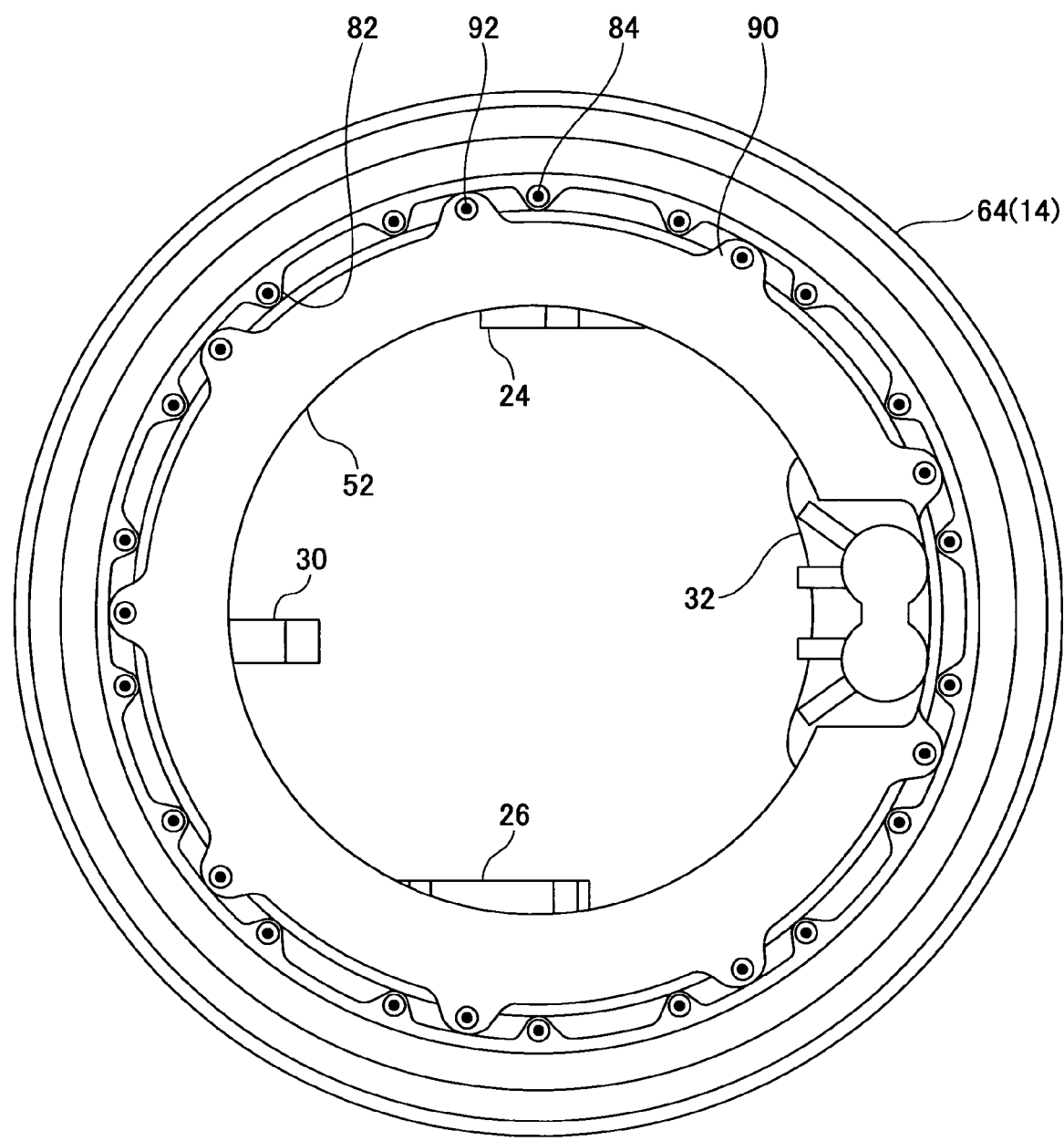
FIG. 5 is a side view of a wheel driving apparatus of the embodiment shown from an outer side of a vehicle.
Figure 6:
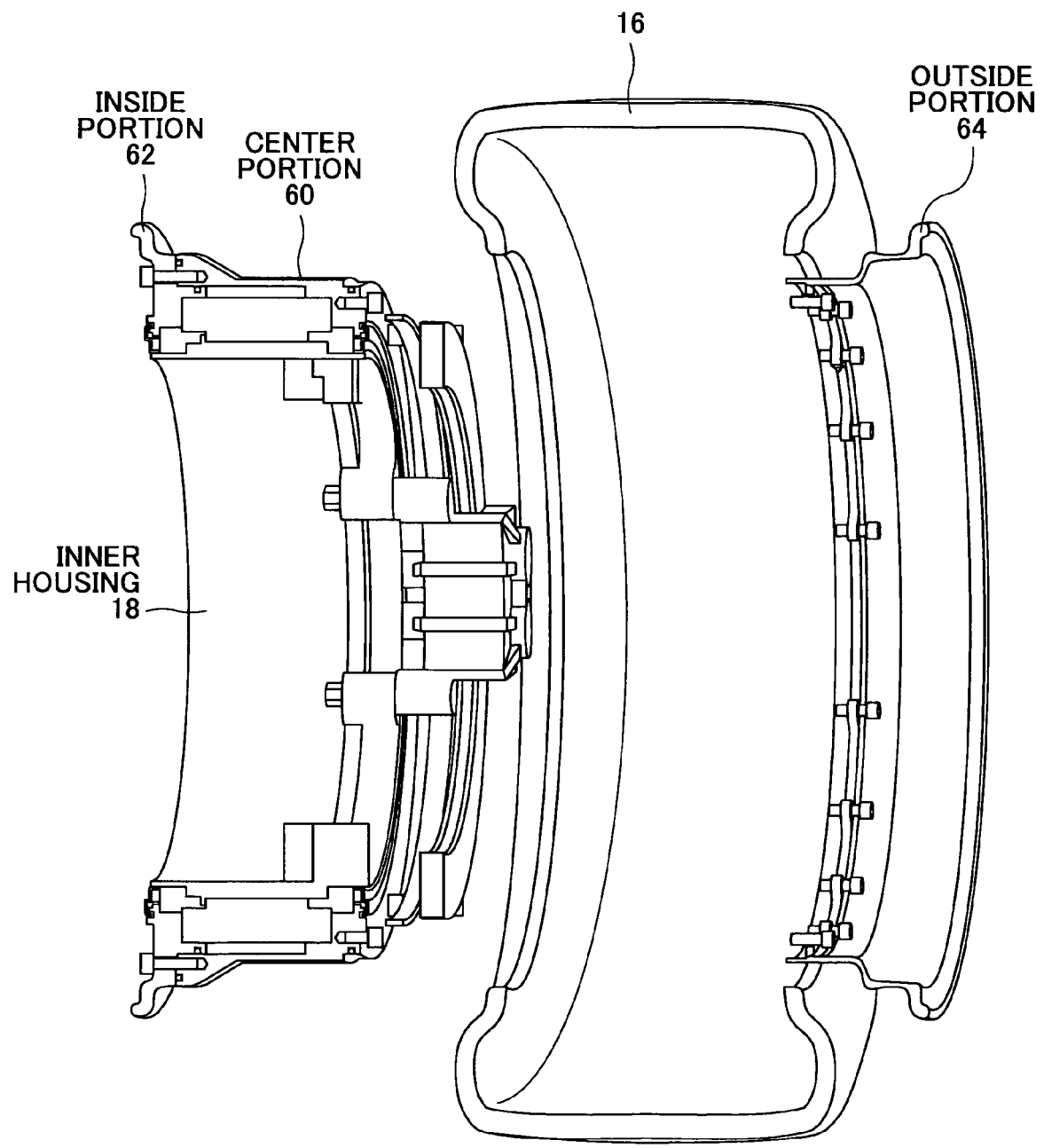
FIG. 6 is an exploded cut-away view showing a main section of a wheel driving apparatus of the embodiment in a radial direction thereof.

FIG. 3 is an enlarged perspective view showing the wheel 14 and the inner housing 18, which are main sections of the wheel driving apparatus 10 of the embodiment, by cutting away in a radial direction of the wheel. FIG. 4 is an enlarged cross-sectional view showing the wheel 14 and the inner housing 18, which are a main section of the wheel driving apparatus of the embodiment taken along a predetermined plane other than that in FIG. 3. FIG. 5 is a side view of the wheel 14 and the inner housing 18 of the wheel driving apparatus 10 of the embodiment shown from an outer side of a vehicle in a width direction thereof. FIG. 6 is an exploded view showing the wheel 14, the inner housing 18 and the tire 16, which are main sections of the wheel driving apparatus 10 of the embodiment by cutting away in a radial direction thereof.

The wheel 14 has a three-piece structure of being divided along a rotational axis into three portions, i.e. a center portion 60, an inside portion 62 located inside the center portion 60, and an outer-of-body portion 64 located outside the center portion 60. The center portion 60 is substantially shaped like a cylinder and has a diameter substantially the same as an inner diameter of the tire 16. The inside portion 62 is a rim portion being in contact with an outer surface of the tire 16 and shaped to have a step for mounting the tire 16 on it. The outside portion 64 is a rim portion being in contact with the other outer surface of the tire 16 and shaped to have a step for mounting the tire 16 on it. The center portion 60 and the inside portion 64 have corresponding shapes enabling to assemble these.

Specifically, the center portion 60 includes a cylindrical part 60a, a side rib 60b adjacent to the cylindrical part 60a on an outer side of the vehicle body, and a thick part 60c adjacent to the cylindrical part 60a on an inner side of the vehicle body. The center portion 60 is configured by arranging the side rib 60b, the cylindrical part 60b, and the thick part 60c sequentially in this order from the outer side to the inner side of the vehicle. The cylindrical part 60a has a rotor accommodating part 66 which accommodates and retains the rotor 42 and occupies a part of the spacial region 46. The cylindrical part 60a functions as an outer housing of the rotor 42. The side rib 60b extends from an inner peripheral surface of the cylindrical part 60a toward the rotational axis and along an entire inner periphery of the center portion 60. The thick part 60c is shaped to outwardly protrude from an outer periphery of the cylindrical part 60a, and an outer diameter of the thick part 60c is larger than that of the cylindrical part 60a.

An outer diameter of the center portion 60 gradually increases from the side rib 60b through the cylindrical part 60a to the thick part 60c in this order. The above-described rotor 42 is fixed to the rotor accommodating part 66 of the cylindrical part 60a along the entire inner peripheral surface of the center portion 60. The rotor 42 is fixed to the rotor accommodating part 66 by inserting the rotor 42 into the rotor accommodating part 66 in the direction from the inner side of the vehicle body to the outer side thereof along the rotational axis.

Fastening holes 70 are made in the thick part 60c toward the center portion 60 in a rotational axis direction. A plurality of the fastening holes 70 are provided at a predetermined interval along an entire periphery of the thick part 60c. Further, the inside portion 62 has a side rib 72 extending from its inner peripheral surface, opposite to the rotor accommodating part 66 of the center portion 60, in a rotational axis direction. The side rib 72 is formed along the entire inner peripheral surface of the inside portion 62. A fastening hole 74 penetrating through the inside portion 62 is made in a rotational axis direction. The fastening hole 74 is made on an outer peripheral side of the inside portion 62 opposite, in a rotational axis direction, to the rotor accommodating part 66 of the center portion 60. The fastening holes 74 are arranged opposite to the fastening holes 70 in a rotational axis direction and at the predetermined interval along an entire periphery of the inside portion 62.

The center portion 60 and the inside portion 62 are fastened by for example bolts 76 inserted into the fastening holes 70 and 74. When the center portion 60 and the inside portion 62 are fastened by the bolts, the side rib 60b of the center portion 60 and the side rib 72 of the inside portion 62 are arranged opposite to thereby form the spacial region 46. As described, the rotor 42 is fixed inside the rotor accommodating part 66.

Fastening holes 78 are made in the side rib 60b toward the center portion 60 in a rotational axis direction. The fastening holes 78 are provided at a predetermined interval along an entire periphery of the side rib 60b. Fastening holes 80 penetrating through the outside portion 64 are made in a rotational axis direction. The fastening holes 80 are arranged opposite, in a rotational axis direction, to the fastening holes 78 at the predetermined interval along the entire periphery of the outside portion 64. The fastening holes 80 are made in protruding parts 82 which protrude from an inner peripheral surface of the outside portion 64 in a rotational axis direction at a predetermined interval. The center portion 60 and the outside portion 64 are fastened by bolts 84 inserted into the fastening holes 78 and 80.

A fastening hole 86 is opened in the side rib 60b toward the outside of the vehicle body in a rotational axis direction. The fastening holes 86 are made at a predetermined interval in positions where the fastening holes 78 for fastening the wheel do not exist along the entire periphery of the side rib 60b. Fastening holes 88 penetrating through a brake disc 52 are opened in a rotational axis direction. A plurality of fastening holes 88 are arranged opposite, in a rotational axis direction, to the fastening holes 86 at the predetermined interval along an entire periphery of the brake disc 52. The fastening holes 88 are made in brake disc attaching portions 90 which are foamed on an outer peripheral surface of the brake disc 52 in a direction outward a radius of the brake disc 52. The brake disc 52 is fastened onto the center portion 60 by the bolts 92 inserted into the fastening holes 86 and 88 interposing hollow spacers 94 between the fastening holes 86 and 88.

The outside portion 64 and the brake disc 52 are configured so as not to interfere in a rotational axis direction. The outer diameter of the brake disc 52 is smaller than the innermost diameter of the outside portion 64, and the innermost diameter of the outside portion 64 is larger than the outer diameter of the brake disc 52. Specifically, the innermost diameter of the protruding parts 82 of the outside portion 64 is larger than a diameter of the outer peripheral surface of the brake disc 52 excluding the brake disc attaching portions 90. The outermost diameter of the brake disc attaching portions 90 is smaller than the inner diameter of the outside portion excluding the protruding parts 82. The outside portion 64 can be attached to and detached from the center portion 60 under a state in which the brake disc 52 is attached to the center portion 60. Simultaneously, the brake disc 52 can be attached to the center portion 60 and detached from the center portion 60 under a state in which the outside portion 64 is attached to the center portion 60. As described, the wheel 14 is divided in the rotational axis direction into three portions, i.e. the center portion 60, the inside portion 62, the outside portion 64; and the outside portion 64 is fastened onto the center portion 60 by the bolts 84. Accordingly, the outside portion 64 can be detached from or attached to the center portion 60 while maintaining the connection between the center portion 60 and the inside portion 62.

As described, the inside portion 62 is fastened onto the center portion 60 by the bolts 76. The center portion 60 and the inside portion 62 are integrated or divided by fastening or releasing the bolts 76. Accordingly, the inside portion 62 can be detached from or attached to the center portion 60 while maintaining the connection between the center portion 60 and the outside portion 64.

As described, the rotor 42 of the motor 40 is fixed to the center portion 60 of the wheel 14. Therefore, it is possible to detach the outside portion 64 from the center portion 60 without removing the rotor 42 from the vehicle body and a portion of the wheel 14 on the vehicle body side. Further, it is also possible to detach the inside portion 62 from the center portion 60 without removing the rotor 42 from the wheel 14.

The outside portion 64 is vulnerable to collide with a curbstone and be damaged in comparison with the center portion 60. Even when it is necessary to exchange the outside portion 64, it can be easily exchanged without removing the rotor 42 from the wheel. Meanwhile, the inside portion 62 and the outside portion 64 are vulnerable to be hit by stones tipped up while the vehicle is moving. When it is necessary to exchange the inside portion 62, it can be easily exchanged after removing the driving wheel 12 from the vehicle without removing the rotor 42 from the driving wheel.

The outside portion 64 and the inside portion 62 are connected via the center portion 60 and in contact with outer surfaces of a tire 16 to mount the tire 16. An inner diameter of the tire 16 is substantially the same as an outer diameter of the center portion 60. Therefore, when the outside portion 64 is detached from the center portion 60, the tire looses support by the outside portion 64 and can be detached by pulling out from the center portion 60 in a rotational axis direction. At this time, it is unnecessary to remove the driving wheel 12 from the vehicle body. Therefore, it is possible to easily exchange the tire 16 by detaching only the outside portion 64 from the wheel 14 without removing the driving wheel 12 from the vehicle body. If the driving wheel 12 is removed from the vehicle body, it is necessary to disconnect the inner housing 18 of the driving wheel 12 from a suspension. However, according to the embodiment, it is unnecessary to disconnect the inner housing from, for example, a suspension and remove the driving wheel.

By this, in a case where it is necessary to exchange an inside portion 62, an outside portion 64, and a tire 16, an exchange work can be done without disassembling a motor 40 and removing a driving wheel 12. Therefore, the exchange work can be simplified and shortened to thereby improve workability of the exchange. As described, since it is unnecessary to disassemble the motor 40, it is also unnecessary to adjust a zero point and rewrite a control software indispensable for assembling the motor. From this point, it is also possible to improve workability in exchanging the inside portion 62, the outside portion 64, and the tire 16.

In the embodiment, the brake disc 52 is attached to the center portion 60 of the wheel 14 and rotated integrally with the wheel 14. The brake disc 52 is shaped like a hollow disk and clamped or released on its inner peripheral side by the brake caliper 32. It is unnecessary to detach the brake disc caliper 32 from the inner housing 18 and to detach the brake disc 52 from the wheel 14 when the outside portion 64 is detached from the center portion 60. Since it is unnecessary to disassemble a brake system, workability of the exchange can be improved.

Further, the brake disc 52 attached to the center portion 60 is formed so as not to interfere with the outside portion 64 in a rotational axis direction. The outer diameter of the brake disc 52 is smaller than the inner diameter of the outside portion 64. It is possible to prevent the outside portion 64 from making contact with the disc brake 52 which is attached to the center portion 60 when the outside portion 64 is attached to or detached from the center portion 60 of the wheel 14. As described, the brake disc 52 can be kept attached to the wheel 14 and further the brake caliper 32 can be kept attached to the inner housing 18 when the outside portion 64 is attached to and detached from the center portion 60, and it is unnecessary to disassemble the brake system. Therefore, the workability in exchanging the outside portion 64 can be improved.

The inner diameter of the tire 16 is substantially the same as the outer diameter of the center portion 60 and larger than the inner diameter of the outside portion 64 in the vicinity of the center portion 60. Therefore, the inner diameter of the tire 16 is larger than the outer diameter of the brake disc. Thus, it is possible to prevent the inner periphery of the tire 16 from making contact with the brake disc 52 when the tire 16 is mounted on or dismounted from the outer periphery of the wheel 14. As described, the brake disc 52 can be kept attached to the wheel 14 and further the brake caliper 32 can be kept attached to the inner housing 18 when the tire 16 is mounted on and removed from the center portion 16, and it is unnecessary to disassemble the brake system. Therefore, the workability in exchanging the tire 16 can be improved.

When the center portion 60 and the inside portion 62 are fastened by the bolts, the side rib 60b of the center portion 60 and the side rib 72 of the inside portion 62 are arranged oppositely to thereby form the spacial region 46 for accommodating the motor 40. Here, the rotor 42 is fixed inside the rotor accommodating part 66. In the embodiment, the motor 40 is retained in the spacial region 46 using the side ribs 60b and 72 as a motor housing. Therefore, it is possible to improve an efficiency of assembling the motor into the driving wheel 12.

Further, the side ribs 60b and 72 extend from the inner peripheral surfaces of the center portion 60 and the inside portion 62 toward the rotational axial direction and along an entire periphery of the inner peripheral surfaces. According to the structure, it is possible to prevent the wheel 14 from deforming in its radius direction in comparison with a structure in which the side ribs 60b and 72 are not provided. Therefore, it is possible to ensure annular rigidity or circle hardness of the wheel 14 by preventing deformation of the wheel 14 in its radial direction. As a result, a change of a gap between the rotor 42 and the stator 44 are prevented, thereby restricting a torque variation of the motor 40.

As described, the diameters of the side rib 60b, the cylindrical part 60a, and the thick part 60c gradually increase in this order. The cylindrical part 60a of the center portion 60 has the rotor accommodating part 66, included in the spacial region 46, for accommodating and retaining the rotor 42. Therefore, it is possible to fix the rotor 42 to the rotor accommodating part 66 by inserting the rotor 42 to the center portion 60 in the rotational axis direction from the inside of the vehicle body to the outside thereof in assembling the motor to the driving wheel 12. Therefore, a property of assembling the rotor 42 can be improved. The inner diameter of the center portion 60 may gradually increase or decrease along a rotational axis direction. For example, it is sufficient to use two molding dies separable in a rotational axis direction in producing the center portion 60. Therefore, it is possible to improve productivity of the wheel driving apparatus by easily producing the center portion 60.

As described, the center portion 60 and the inside portion 62 are mutually fastened by inserting the bolts 76 into the fastening holes 70 and 74, which are opened at the predetermined interval through the entire periphery. The fastening holes 70 and 74 are made on the outer peripheral side of the rotor accommodating part 66 of the center portion 60. Therefore, bolts fastening the center portion 60 to the inside portion 62 are positioned in an outer peripheral side of the rotor 42 which is fixed to the rotor accommodating part 66.

It is unnecessary to make the fastening holes 70 and 72 for fastening the center portion 60 to the inside portion 62 by the bolts in the vicinity of the rotor 42 and the rotor accommodating part 66 in a rotational axis direction. Instead, it is sufficient to make the fastening holes 70 and 72 outside the rotor 42 and the rotor accommodating part 66 in the radius direction. In the embodiment, it is possible to shorten the total width of the wheel 14 in the width direction of vehicle. Therefore, the wheel driving apparatus 10 can be applicable to a tire 16 having a narrow width. Or it is possible to increase lengths of the rotor 42 and the rotor accommodating part 66 as long as possible. Therefore, a motor performance can be improved without increasing the total width of the wheel 14.

Further, the wheel 14 is held by the inner housing 18 via radial bearings 36 and 38 so as to be rotatable relative to the inner housing. As described, the spacial region 46 between the inner housing 18 holding the motor 40 and the wheel 14 is hermetically sealed at the end portions in a rotational axis direction by the oil seals 48 and 50. These radial bearings 36 and 38 and the oil seals 48 and 50 are provided at positions respectively in the vicinity of the smallest diameters of the side ribs 60b and 72.

In the above-mentioned structure, it is possible to minimize a rotational radius of rotating members including the radial bearings 36 and 38 and the oil seals 48 and 50, which rotate when the driving wheel 12 rotates. Since circumferential speeds of the rotating members can be reduced as low as possible, the radial bearings last longer and reliability of the oil seals 48 and 50 can be enhanced. As described, the annular rigidity or circle hardness of the wheel 14 is ensured by the side ribs 60b and 72, positional deviations of the radial bearings 36 and 38 and the oil seals 48 and 50 are restricted and it is possible to ensure a sealing property by preventing their life times from shortening.

Figure 7A:
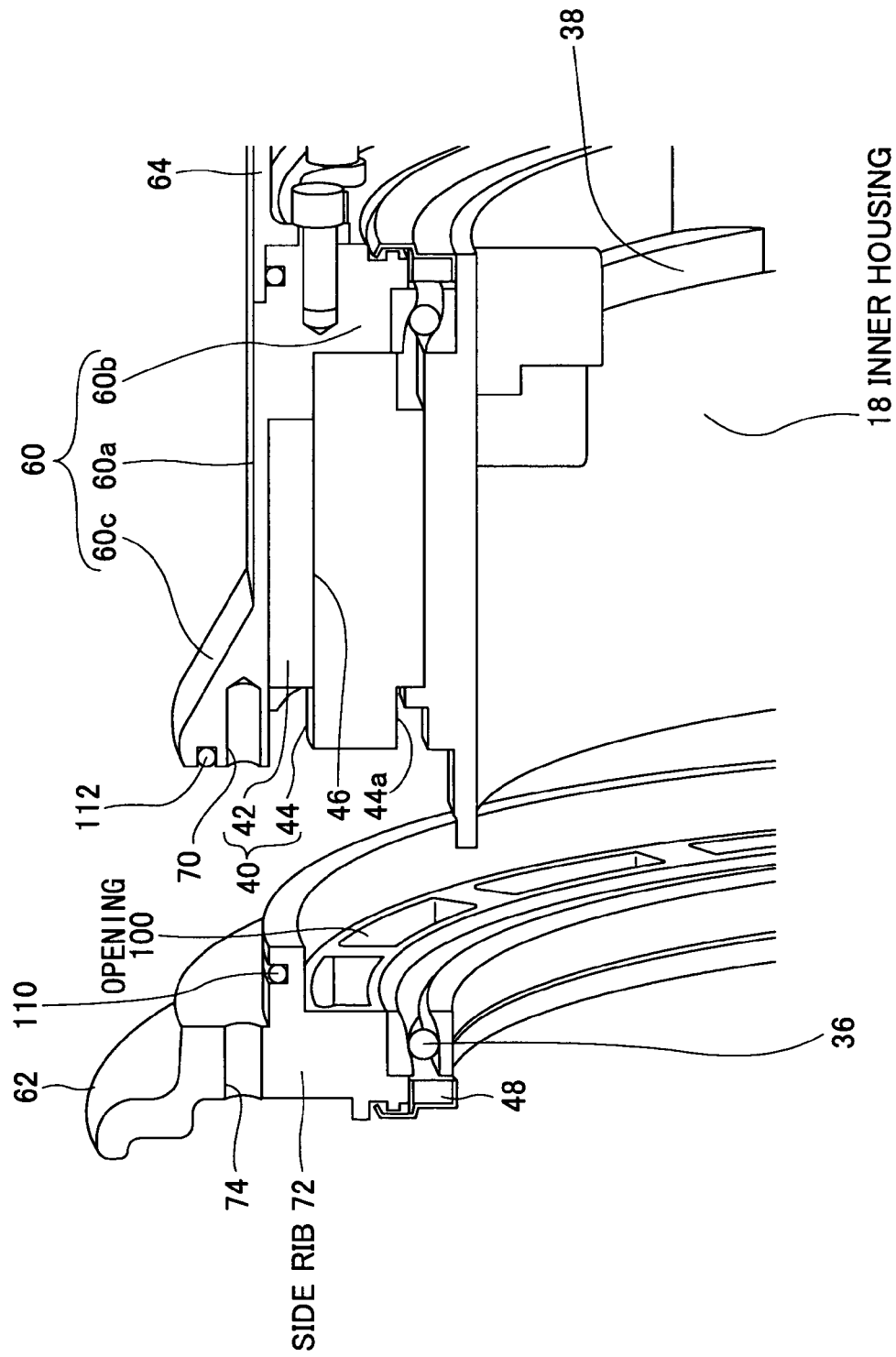
FIG. 7A is a partial cut-away exploded view showing a main section of a wheel driving apparatus of the embodiment in a radial direction thereof.
Figure 7B:
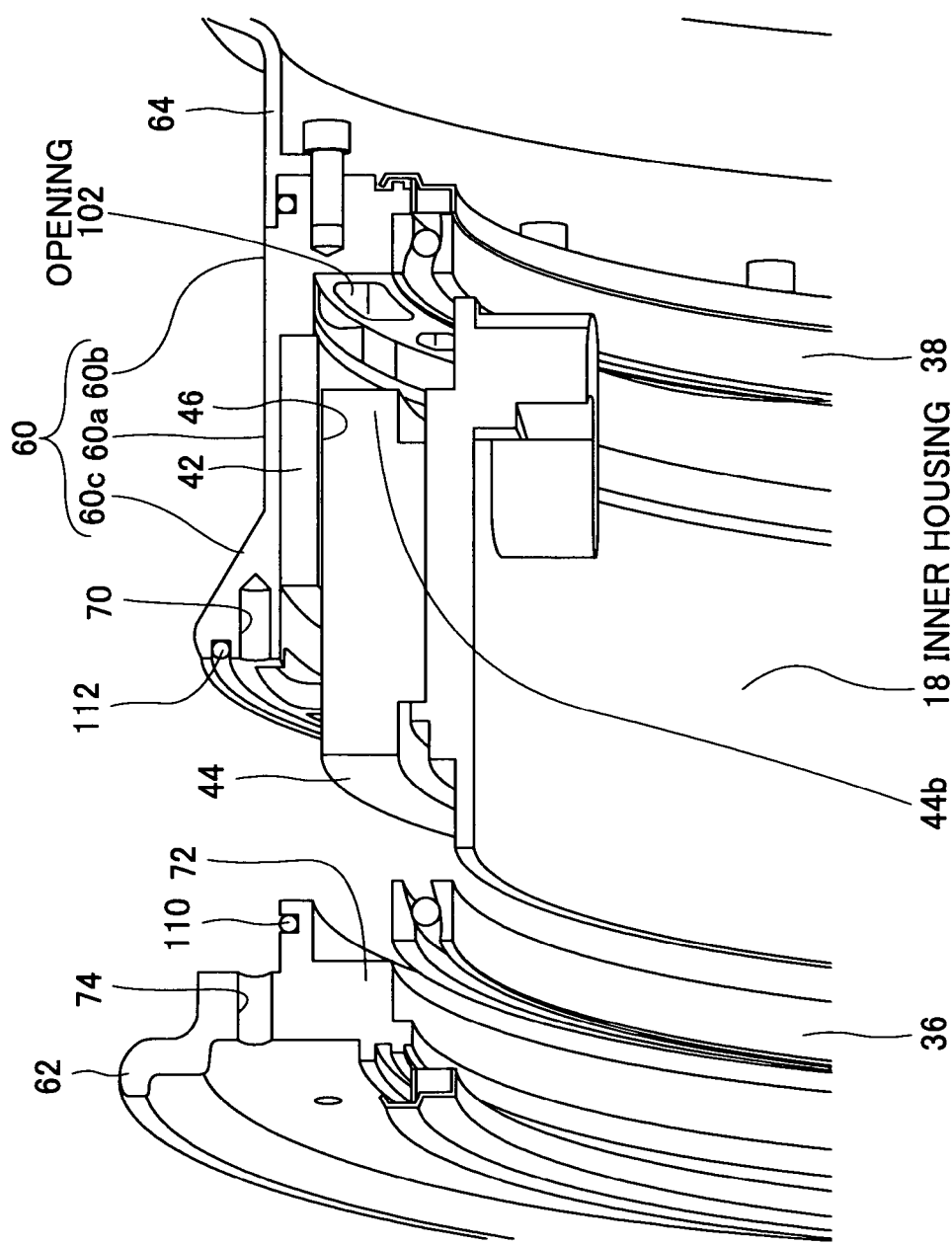
FIG. 7B is a partial cut-away exploded view showing a main section of a wheel driving apparatus of the embodiment in a radial direction thereof.

FIG. 7A is an exploded view showing a main section of a wheel driving apparatus of the embodiment by partially cutting away in a radial direction thereof. FIGS. 7A and 7B are partial views showing the wheel driving apparatus 10 of the embodiment by longitudinally cutting away the wheel 14 and the inner housing 18 and dividing the inside portion 62 from the center portion 60. FIG. 7A shows the outer side of the inside portion 62, and FIG. 7B shows an inner side of the outside portion 64.

As described, the spacial region 46 between the inner housing 18 and the wheel 14 is approximately in a ring-like shape, and hermetically sealed to enclose an oil. Therefore, the spacial region 46 includes an oil chamber, and the oil is accumulated in a lower region of the spacial region 46. Here, it is necessary to bring the oil accumulated in the lower region of the spacial region 46 upward in order to sufficiently cool an upper region of the spacial region 46 including the stator 44, especially its upper portion, because the stator 44 is fixed to the inner housing which does not rotate.

In the embodiment, the side rib 72 foamed in the inside portion 62 has a plurality of openings 100 made through the rotational axis direction. The openings 100 are adjacent to a circular coil end 44a of the stator 44 when the inside portion 62 is fastened onto the center portion 60 by the bolts to form the spacial region 44. The respective openings 100 are shaped like a recess in a rotational axis direction and open toward the circular coil end 44a. The plurality of openings 100 are arranged along a periphery of the side rib 72 of the inside portion 62 and also along the circular coil end 44a of the stator 44 at a predetermined interval. When one or more of the openings 100 are positioned low during the rotation of the wheel 14, the one or more of the openings 100 communicate with the lower region of the spacial region 46 accumulating the oil. The diameter of outer peripheral sides inside the openings 100 around the rotational axis is smaller than the outer diameter of the circular coil end 44a around the rotational axis. Said differently, the outermost diameter of the opening 100 is smaller than the outermost diameter of the stator 44 around the rotational axis.

Referring to FIG. 7A, a plurality of openings 102 are made in the side rib 60b of the center portion 60 and opened in the rotational axis direction. The openings 102 are adjacent to a circular coil end 44b of the stator 18 fixed to the inner housing 18 when the inside portion 62 is fastened on to the center portion 60 by the bolts 84. The openings 102 are recessed in a rotational axis direction and opens toward the circular coil end 44b. The plurality of the openings 102 are arranged along a periphery of the side rib 60b of the center portion 60 and also along the circular coil end 44b of the stator 44 at a predetermined interval. When one or more of the openings 102 are positioned low during the rotation of the wheel 14, the one or more of the openings 102 communicate with the lower region of the spacial region 46 accumulating the oil. The diameter of outer peripheral sides inside the openings 102 made in the center portion 60 is smaller than the outer diameter of the circular coil end 44b. Said differently, the outermost diameter of the opening 102 is smaller than the outermost diameter of the stator 44.

With the structure, the openings 100 and 102 rotate together with the wheel and communicate with the lower region of the spacial region 46 accumulating the oil when positioned low during the rotation of the wheel 14. The oil flows as a cooling fluid into the openings 100 and 102 from the lower region of the spacial region accommodating the oil and communicating with the openings. After the oil flows into the openings 100 and 102, these openings are moved upward along with the rotation of the wheel 14. At this time, the oil inside the openings 100 and 102 is carried upward along with the rotation of the wheel 14 and concentrate on outer peripheral sides inside the openings by a centrifugal force caused by the rotation of the wheel.

The outer peripheral sides inside the openings 100 and 102 are positioned on an inner diameter side of the outermost diameters of the circular coil ends 44a and 44b of the stator 44, and the outermost peripheral ends of the circular coil ends 44a and 44b are positioned outside the outer peripheral sides inside the openings 100 and 102. A part or all of the oil concentrated on the outer peripheral sides inside the openings 100 and 102 moves onto a side of the circular coil ends 44a and 44b via opening surfaces of the openings by a centrifugal force. The oil thus moved from the openings 100 and 102 is thrown over the circular coil ends 44a and 44b. Thereafter, the oil falls downward through a gap between the stator 44 and the rotor 42, a gap between the circular coil end 44a and the side rib 72, and/or a gap between the circular coil end 44b and the side rib 60b to resultantly be accumulated in the lower region of the spacial region 46.

In the embodiment, since it is possible to discharge the oil upward carried by the openings 100 and 102 to the circular coil ends 44a and 44b of the stator 44 by a centrifugal force of the wheel 14, it becomes easy to discharge the oil to the entire periphery including the circular coil ends 44a and 44b in a upper region of the spacial region 46. Therefore, it is possible to sufficiently cool the stator in the upper region of the spacial region 46, thereby transferring heat generated in the circular coil ends 44a and 44b of the stator 44 effectively to the inner housing 18 and the wheel 14 and enhancing a cooling efficiency of the stator 44.

It is preferable to form the outer peripheral sides inside the openings 100 and 102 so as to increase their bore from a bottom in the vicinity of a vehicle body to the opening surface in a tapered manner. This formation causes the oil concentrated on the outer peripheral end of the openings 100 and 102 to easily move onto the sides of the circular coil ends 44a and 44b of the stator 44.

Further, the oil inside the spacial region 46 is discharged to the radial bearings 36 and 38 for rotating the wheel 14 relative to the inner housing 18. It is possible to lubricate the radial bearings 36 and 38 by the oil inside the spacial region 46 and maintain a rotation capacity of the wheel 14 relative to the inner housing 18.

As described, the center portion 60 and the inside portion 62 of the wheel 14 are fastened by the bolts 76. The motor 40 is retained in the spacial region 46 between the wheel 14 and the inner housing 18, and the spacial region 46 accommodates and seals the oil. In order to ensure a sealing capability of the spacial region 46, it is necessary to prevent the oil from flowing outward from the spacial region 46 or extraneous matters such as water from flowing into the spacial region 46 from an outside through the fastening holes 70 and 74 and abutting surfaces of the center portion 60 and the inside portion 62 in the vicinity thereof.

Therefore, annular O-rings 110 and 112 are provided in the vicinity of the respective fastening holes 70 and 74 of the center portion 60 and the inside portion 62. The O-ring 110 is a rubber-like member for securing a sealing capability of the spacial region 46 against the fastening holes 70 and 74 and abutting surfaces of the center portion 60 and the inside portion 62 in the vicinity of the fastening holes 70 and 74. The O-ring 112 is a rubber-like member for securing a sealing capability of the fastening holes 70 and 74 against the outside and abutting surfaces of the center portion 60 and the inside portion 62.

When the center portion 60 and the inside portion 62 are fastened by the bolts 76 inserted into the fastening holes 70 and 76, the spacial region 46 is sealed from the bolt fastening holes 70 and 74 and so on by the O-ring 110, and the bolt fastening holes 70 and 74 are sealed from the outside by the O-ring 112. Therefore, it is possible to prevent the oil from flowing to the outside and the extraneous matters from flowing into the spacial region 46 from the outside by the O-rings 110 and 112.

Figure 8A:
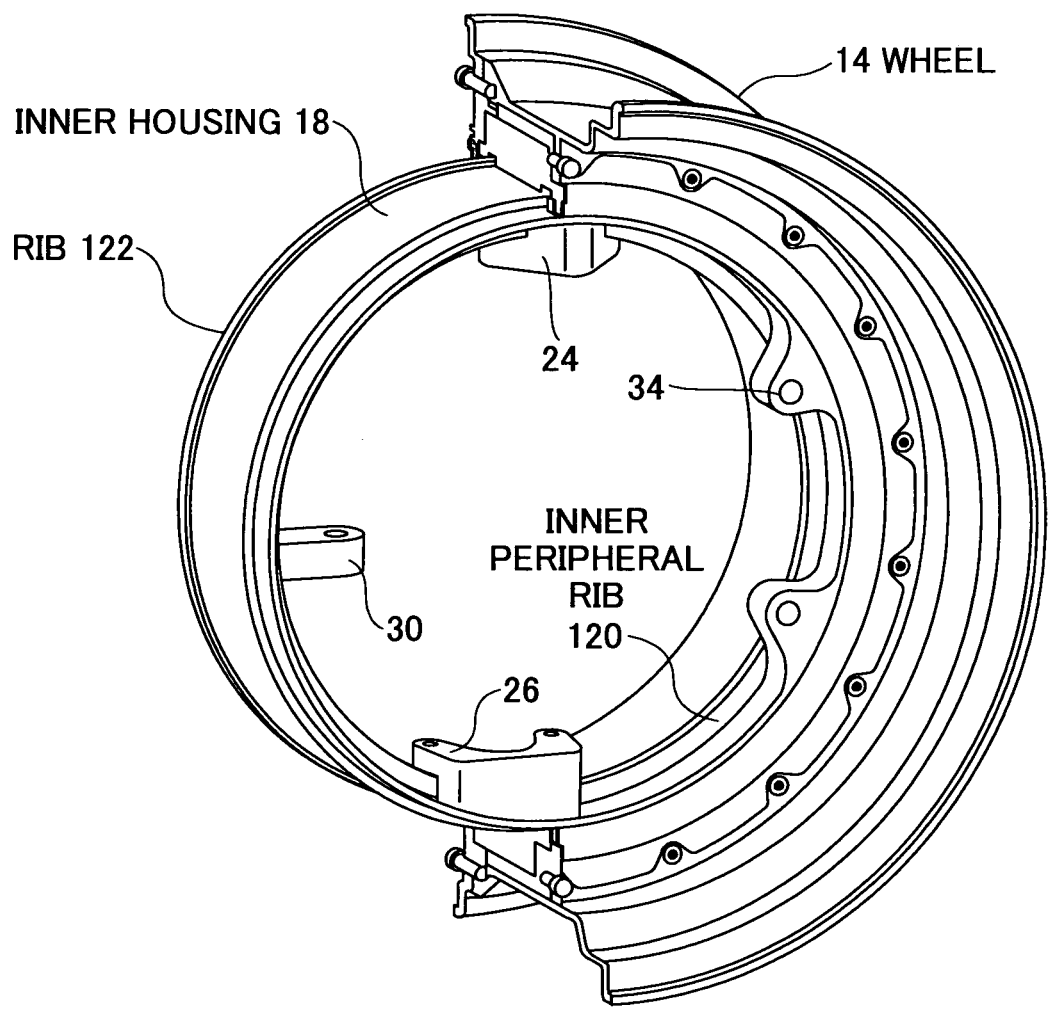
FIG. 8A is a view showing a structure of an inner housing of a wheel driving apparatus of the embodiment.
Figure 8B:
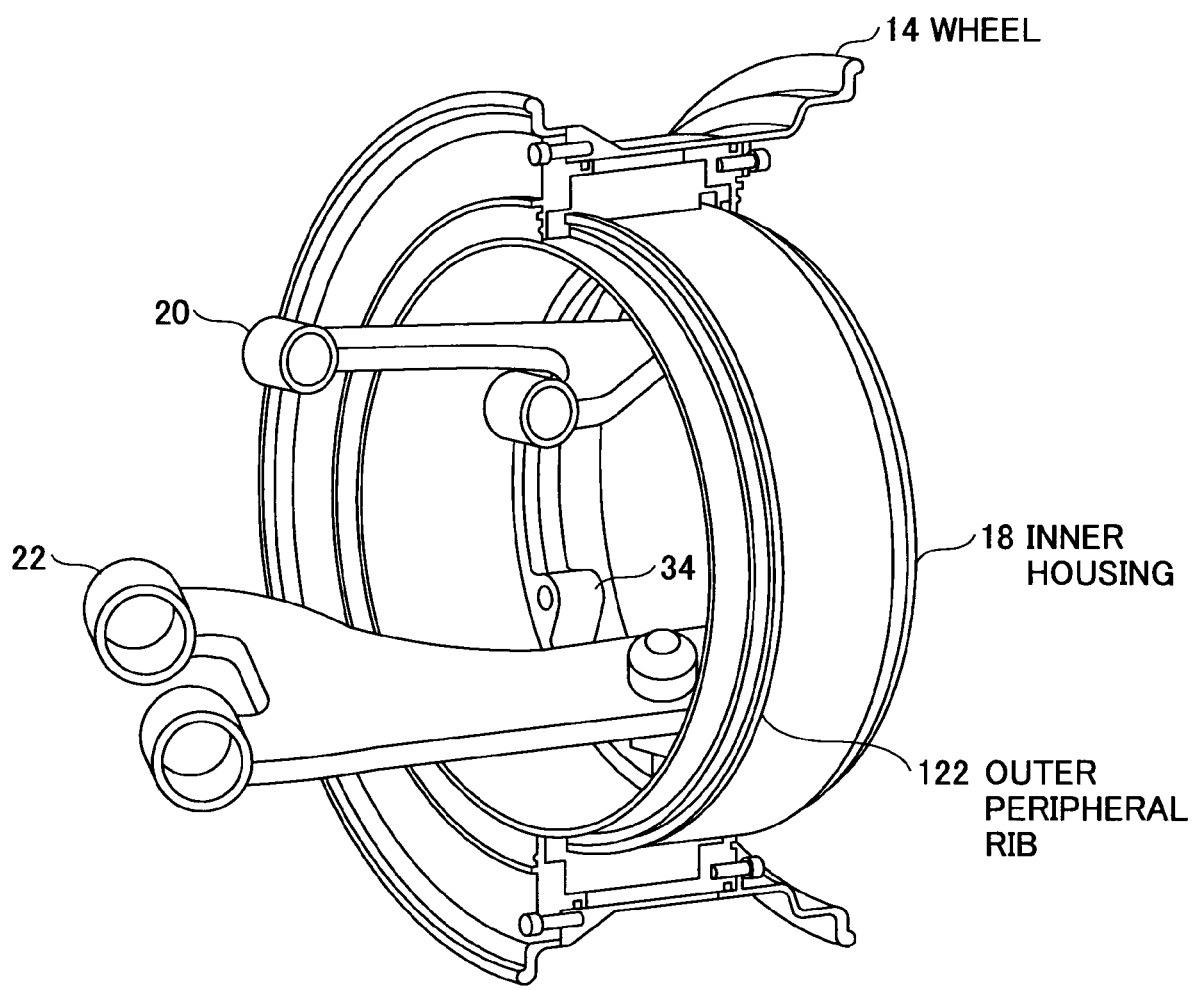
FIG. 8B is a view showing a structure of an inner housing of a wheel driving apparatus of the embodiment.

FIGS. 8a and 8b are views showing a structure of the inner housing 18 of the wheel driving apparatus 10 of the embodiment. FIG. 8A shows the outer side of the inner housing 18, and FIG. 8B shows the inner side of the inner housing 18.

As described, the suspension arms 20 and 22, the tie rod 28, and the brake caliper 32 are attached to the inner housing 18 through the attaching portions 24, 26, 30 and 34. The suspension attaching portions 24 and 26, the tie rod attaching portion 30 and the caliper attaching portion 34 are formed on an inner periphery of the inner housing 18. Therefore, a large stress may be applied to the attaching portions 24, 26, 30 and 34 along with actions of the suspension arms 20 and 22, the tie rod 28, and the brake caliper 32. In order to properly maintain the rotational drive of the driving wheel 12, it is necessary to ensure a high annular rigidity or circle hardness not only in the wheel but also in the inner housing.

For this, an inner peripheral rib 120 protrudes from an inner peripheral surface of the inner housing 18 toward the rotational axis. The inner peripheral rib 120 is fainted along the entire inner periphery of the inner housing 18 at a position relatively closer to the outside of the vehicle body on the inner peripheral surface of the inner housing 18. The inner peripheral rib 120 circumferentially connects all the attaching portions 24, 26, 30 and 34 at a position relatively closer to the outside of the vehicle body on the inner peripheral surface of the inner housing 18. The attaching portions 24, 26, 30 and 34 are connected via the inner peripheral rib 120.

By forming the inner peripheral rib 120 on the inner housing 18, a deformation in a radial direction unlikely occurs in comparison with a structure in which the inner peripheral rib 120 is not formed. Further, since the inner peripheral rib 120 connects the attaching portions 24, 26, 30 and 34, even if a large stress is applied to the attaching portions by actions of the suspension arms 20 and 22, the tie rod 28, and the brake caliper 32 respectively connected to the attaching portions, it is possible to prevent a deformation of the inner housing 18 caused by the stress.

Further, an outer peripheral rib 122 protrudes on an outer peripheral surface of the inner housing 120 in an outward radius direction. The rib 122 is formed along the entire outer periphery of the inner housing 18 at a position relatively closer to the inside of the vehicle body on the outer peripheral surface of the inner housing 18. The rib 122 functions as a protrusion for determining a position of the stator 44, attached to the outer peripheral surface of the inner housing 18. In comparison with a structure in which the rib 122 is foamed, a deformation of the inner housing 18 in the radial direction of the inner housing 18 unlikely occurs.

According to the embodiment, it is possible to ensure the annular rigidity or circle hardness of the inner housing 18 by reinforcing the inner housing 18 by the ribs 120 and 122. Resultantly, a change of a gap between the rotor 42 and the stator 44 caused by the deformation of the inner housing 18 can be suppressed, and simultaneously it is possible to ensure sealing capabilities of the oil seals 48 and 50 by preventing the lifetime of the radial bearings 36 and 38 from being shortened.

The above mentioned two ribs 120 and 122 are formed on the inner and outer peripheral surfaces of the inner housing 18. It is preferable to form these at positions closest to the outside or inside of the vehicle body in order to further improve the annular rigidity or circle hardness of the inner housing 18.

In the embodiment, the rib 122 is formed closest to the inside of the vehicle body on an outer peripheral surface of the inner housing 18. The rib 122 can be formed on either the outside or inside of the inner housing 18. Irrespective of the outside or inside, the annular rigidities or circle hardness of the inner housing 18 become equivalent. However, provided that the rib 122 is formed on the inner peripheral surface of the inner housing 18, the inner diameter of rib 122 of the inner housing 18 becomes small enough to possibly cause the rib 122 to be in contact with the suspension arms 20, 22 and the tie rod 28, which are connected to the attaching portions 24, 26, and 30 at the position closer to the outside of the vehicle body and on the inner peripheral surface of the inner housing 18, when the driving wheel displaces (travels) with respect to the vehicle body.

Since the rib 122 is formed on the outer periphery closer to the vehicle body of the inner housing 18, the inner diameter of inner housing on the vehicle body side is not affected by the rib 122 to thereby sufficiently maintain gaps between the inner housing 18 and the suspension arm 20, 22 and the tie rod 28. Therefore, actions of the suspension arm 20, 22 and the tie rod 28 are not limited.

Further, the rib 122 formed on the outer surface of the inner housing 18 functions as the member of determining the position of the stator 44 in a rotational axis direction. It is unnecessary to additionally provide a dedicated member for determining the position of the stator 44 with respect to the inner housing 18 in a rotational axis direction.

Correspondence relationships of terminologies between the scope of claims and the above embodiment are as follows. "Main Body Portion" corresponds to the center portion 60 and the inside portion 62; "Wheel Attachment" does the brake disc 52, the brake caliper 32 and so on; "Side Rib" does the ribs 60b and 72; "Seal" does the oil seals 48 and 50; "Inner Peripheral Rib" does the rib 120; and "Outer Peripheral Rib" does the rib 122, respectively for example. Further, "Cooling Fluid Chamber" corresponds to the oil chamber inside the spacial region 46.

The driving wheel 12, on which the wheel driving apparatus is mounted, is not limited to a wheel to be steered, to which a tie rod is connected, and it may be a wheel not to be steered.

As described, the wheel 14 has a three-piece structure of being divided into three portions, i.e. the center portion 60, the inside portion 62, and the outside portion 64; however and the outside portion 64 and the center portion 60 may be integrated into the inside portion 62 to be a two-piece structure. In this case also, the outside portion 64 can be configured so as to be detached from the other portions of the wheel 14 without contacting the brake disc 52.

The present invention is not limited to these embodiments, but variations and modifications may be made without departing from the scope of the present invention.

The present application is based on Japanese Priority Patent Application No. 2008-326245 filed on Dec. 22, 2008 with the Japan Patent Office, the entire contents of which are hereby incorporated by reference.

The invention claimed is:

1. A wheel driving apparatus including a cylindrical inner housing supported by a vehicle body via a suspension, a wheel supported by the cylindrical inner housing so that the wheel is rotatable relative to the cylindrical inner housing, a motor having a stator attached to the cylindrical inner housing and a rotor attached to the wheel, the wheel comprising:
   a main body portion;
   an outside portion positioned on an outer side of the vehicle body; and
   a wheel attachment including a circular brake disc, the circular disc brake having an outer diameter smaller than an inner periphery of the outside portion and being attached to the main body portion on the outer side of the vehicle body,
   wherein the rotor is attached to the main body portion,
   wherein when the wheel attachment is attached to the main body portion, the wheel attachment does not prevent the outside portion from being attached to or detached from the main body portion, and
   wherein the main body portion comprises:
      a center portion that has a rib extending along an entire inner periphery of the center portion toward a rotational axis of the wheel; and
      an inside portion that has a rib extending along an entire inner periphery of the inside portion toward the rotational axis of the wheel, and
      the motor is retained between these ribs.

2. The wheel driving apparatus according to claim 1, further comprising:
   a brake caliper which is attached to the cylindrical inner housing and includes brake pads; and
   a circular brake disc which is configured to be clamped by the brake pads on an inner peripheral side of the circular brake disc, thereby stopping the circular brake disc from rotating.

3. The wheel driving apparatus according to claim 1, wherein the center portion and the inside portion are connected to form the main body portion at positions outside an outermost periphery of the rotor from the rotational axis of the wheel.

4. The wheel driving apparatus according to claim 1, wherein
   the main body portion has a plurality of openings, which are made along a circular coil end of the stator and toward the circular coil end along the rotational axis and can accommodate a cooling fluid, and
   outermost diameters of the openings around the rotational axis are smaller than outermost diameter of the circular coil end of the stator around the rotational axis.

5. The wheel driving apparatus according to claim 4, wherein
   a group of the plurality of openings are made in the rib of the inside portion along the circular coil end of the stator, and
   another group of the plurality of openings are made in the rib of the center portion along the circular coil end of the stator.

6. The wheel driving apparatus according to claim 1, further comprising:
   bearings which are arranged in the vicinity of respective innermost diameters of the ribs and support the wheel so as to be rotatable relative to the inner housing; and
   seals which are arranged in the vicinity of the respective innermost diameters of the ribs and seal gaps between the wheel and the inner housing.

7. The wheel driving apparatus according to claim 2, wherein the inner housing further comprises:
   an inner peripheral rib extending along an entire inner periphery of the inner housing toward the rotational axis of the wheel and integrating an attaching portion for the suspension and for the brake caliper.

8. The wheel driving apparatus according to claim 1, wherein the inner housing further comprises:
   an outer peripheral rib extending along an entire outer periphery of the inner housing outward from the outer periphery.

* * * * *